United States Patent [19]

Palma et al.

[11] Patent Number: 5,173,917
[45] Date of Patent: Dec. 22, 1992

[54] PULSED RING LASERS USING ADJOINT COUPLING CONTROL

[75] Inventors: Gary E. Palma, Bloomfield; John A. Benda, Amston, both of Conn.

[73] Assignee: United Technologies Corporation, Hartford, Conn.

[21] Appl. No.: 781,431

[22] Filed: Oct. 23, 1991

[51] Int. Cl.⁵ .......................................... H01S 3/083
[52] U.S. Cl. ......................................... 372/94; 372/97
[58] Field of Search ........................... 372/92, 94, 97

[56] References Cited

U.S. PATENT DOCUMENTS

| | | | |
|---|---|---|---|
| 4,512,021 | 4/1985 | Chenausky | 372/20 |
| 4,550,410 | 10/1985 | Chenausky | 372/97 |
| 4,841,541 | 6/1989 | Sziklas | 372/94 |

Primary Examiner—John D. Lee
Assistant Examiner—Robert E. Wise

[57] ABSTRACT

A continuously pumped ring laser is pulsed by modulating a small portion of one of the circulating beams and feeding back the modulated radiation in the adjoint mode.

19 Claims, 3 Drawing Sheets

PULSED RING LASERS USING ADJOINT COUPLING CONTROL

The Government has rights in the invention pursuant to a contract awarded by the Department of the Air Force.

CROSS REFERENCE TO RELATED APPLICATIONS

This application is related to the subject matter disclosed and claimed in copending U.S. Ser. No. 781,771 entitled A HIGH POWERED LASER WITH REDUCED OPTICAL ABERRATION by P. R. Blaszuk;

U.S. Ser. No. 780,897, now U.S. Pat. No. 4,173,918 entitled A HIGH POWER LASER HAVING STAGED LASER ADJOINT PULSED FEEDBACK by S. S. Townsend, P. R. Cunningham and J. S. Foley;

U.S. Ser. No. 780,637, now U.S. Pat. No. 5,173,916 entitled OPTICALLY PULSED LASER HAVING COUPLED ADJOINT BEAMS by J. A. Benda;

U.S. Ser. No. 780,898, now U.S. Pat. No. 4,173,907 entitled A MODELOCKED HIGH POWER LASER HAVING AN ADJOINT FEEDBACK BEAM by J. A. Benda, P. R. Blaszuk and G. E. Palma;

U.S. Ser. No. 781,430, now U.S. Pat. No. 5,157,684 entitled OPITCALLY PULSED LASER by J. A. Benda, P. R. Blaszuk, G. E. Palma and D.,C. Smith;

U.S. Ser. No. 781,426, now U.S. Pat. No. 5,179,564 entitled LINEAR POLARIZATION CONTROL OF HIGH POWER LASERS by J. A. Benda, P. R. Blaszuk, J. Forgham and H. L. Cohen;

U.S. Ser .No. 781,427, now U.S. Pat. No. 5,179,563 entitled IMPROVED LINEAR POLARIZATION CONTROL OF HIGH POWER LASERS by G. E. Palma, S. S. Townsend, A. Parasco and J. A. Benda;

U.S. Ser. No. 781,428 entitled CIRCULAR AND ELLIPTICAL POLARIZATION OF A HIGH POWER LASER BY ADJOINT FEEDBACK by J. A. Benda and P. R. Blaszuk filed on even date herewith and assigned to the same assignee herein incorporated by reference.

TECHNICAL FIELD

The field of the invention is that of pulsed laser systems, in which a ring resonator has a high power section and a low power section, the output of the high power section being pulsed by modulating the radiation in the low power section.

BACKGROUND ART

In industrial lasers used for welding or drilling, it is convenient to be able to pulse the optical beam. TEA lasers have been used to provide pulsed beams, as has Q-switching of cw (continuous wave) excited lasers. Also, optical chopping of a cw beam such as in a MOPA configuration or optically chopping the resonator internally have also been used. Each technique has advantages and limitations. Pulsed electrical power supplies are expensive, require voltages sufficient to break down the laser gas and require electrical power conditioning. Optically chopped MOPAs require isolation between the amplifier and the oscillator and are sensitive to self oscillation from feedback from work pieces. Chopping of the high power beam requires a chopper to withstand the effect of the high power beam. U.S. Pat. No. 4,512,021 illustrates passive Q-switching of a waveguide laser having a stable resonator and a coupled control cavity. U.S. Pat. No. 4,550,410 illustrates a coupled-cavity laser in which the coupled cavity serves to pass the output beam. This reference uses transmissive optics that pass more than 15% of the cavity power and therefore is not suitable for industrial power lasers.

DISCLOSURE OF INVENTION

The invention relates to a ring resonator laser, in which a portion of a collimated output beam is tapped off and passed into a low power control section of the total system. This low power section is modulated and the modulated radiation is fed back into the ring resonator as a feedback beam in an adjoint beam mode. This adjoint wave then couples into the forward wave as taught in the prior art. Modulation of this feedback beam has the effect of modulating the feedback of the parent resonator, with an effect that is very large compared to the amount of feedback power.

A feature of the invention is that the amount of power in the feedback leg which is used to pulse the laser is on the order of a few percent of the total power in the parent resonator.

A further feature of the invention is the modification within limits of the pulse repetition rate and pulse width.

Other features and advantages will be apparent from the specification and claims and from the accompanying drawings which illustrate an embodiment of the invention.

BEST MODE FOR CARRYING OUT THE INVENTION

Figure 2:
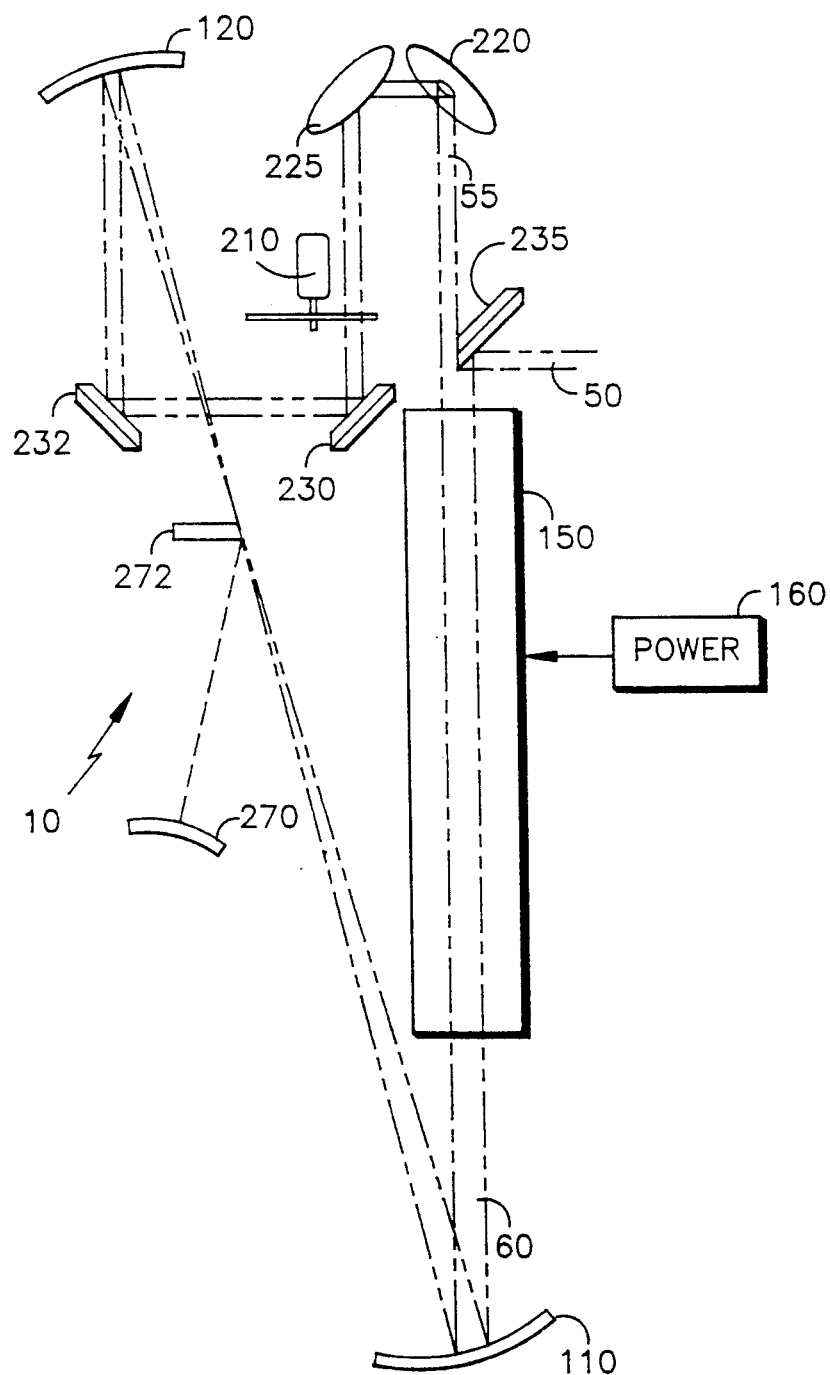
FIG. 2 illustrates a prior art resonator.

Referring to FIG. 2, there is shown a prior art ring resonator 10 of a conventional type that is used for high power applications. The collimated section has a gain medium 150 controlled by a DC power supply 160, meaning a power supply that can be controlled in voltage or current only slowly, as compared with pulsed power supplies and rf power supplies. It will be referred to as substantially DC pump means. The mechanism for producing a population inversion is that of a glow discharge as illustrated in U.S. Pat. No. 3,641,457. A confocal magnifying section has two concave mirrors 110 and 120 and a reverse wave suppressor comprising mirrors 270 and 272 that couple the reverse wave to the forward wave as taught in U.S. Pat. No. 4,841,541, incorporated herein by reference. An output mirror 230 deflects output beam 50 from the circulating beam 60 and permits passage of the circulating power 55. Turning mirrors 220, 225, 230 and 232 transport beam 55 to an appropriate angle to be fed back into feedback mirror 120. Output beam 50 is produced as a collimated output beam.

In order to pulse such a laser, a large mechanical chopper, indicated schematically as 200, is conventionally used. In the case where the output beam 50 has an order of magnitude of 10 kilowatts, there will be several kilowatts in the feedback beam 55 and therefore chopper 200 must be made sufficiently robust in order to modulate that beam without being damaged. Such large, heavy choppers are slow and expensive and must be placed within the main resonator cavity.

Figure 1:
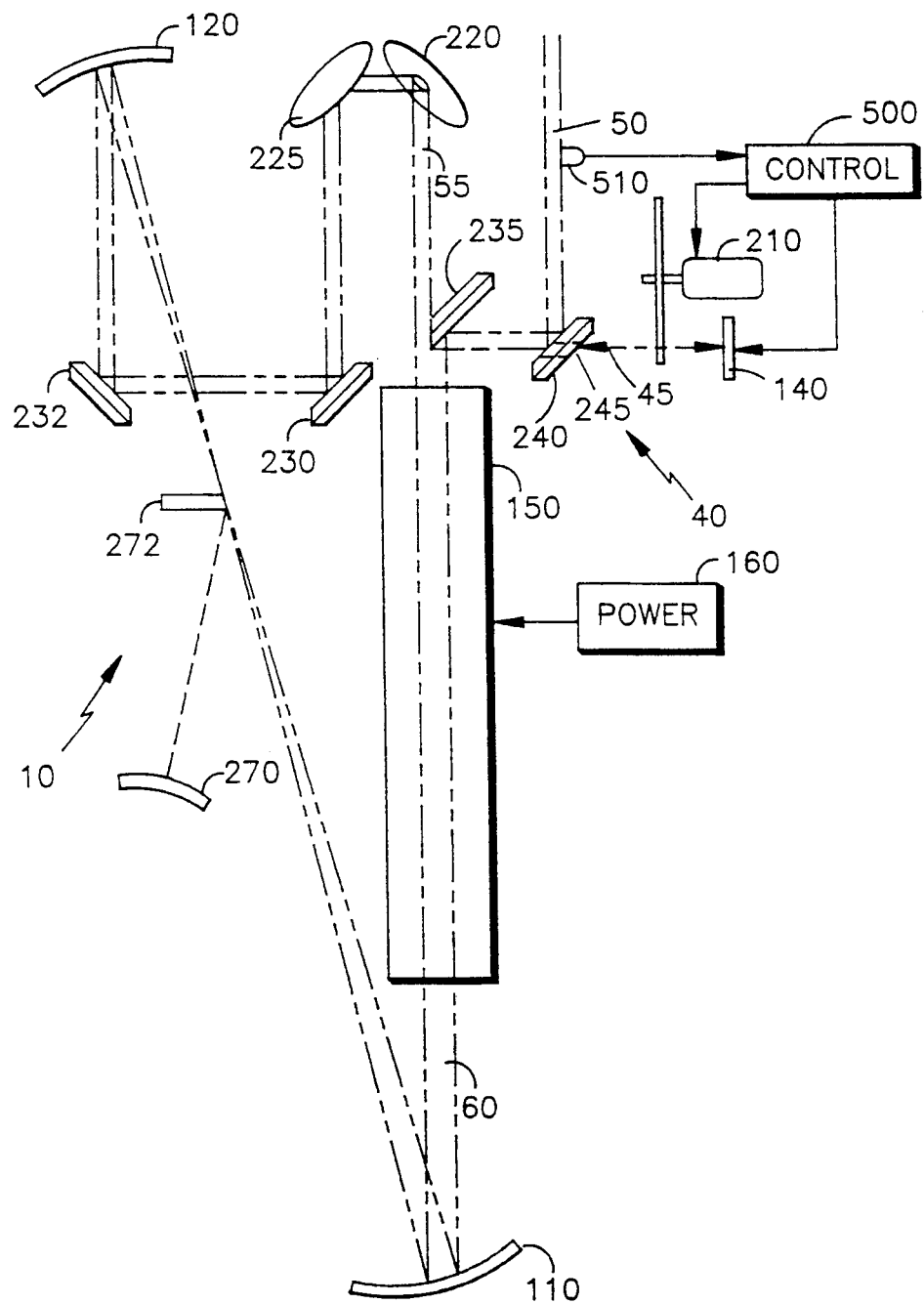
FIG. 1 illustrates an embodiment of the invention.

Referring now to FIG. 1, there is illustrated an embodiment of the invention in which the same elements have the same numbers as in FIG. 2. The 90° rotation effected by mirrors 220 and 225 is specific to the UR-90 ring resonator employed in the reduction to practice. The invention is general and applies to any ring resonator. Thus, mirrors 220 and 225 can lie in a plane if necessary, in which case, a conventional scraper mirror with a central aperture would be used instead of of the straight edge output scraper mirror 235 shown in the Figure.

The output mirror 240, which receives the output beam 50, has a small feedback aperture 245 that passes an output feedback beam 45 to adjoint feedback mirror 140. A smaller, lighter mechanical chopper or shutter 210 is used to modulate the feedback beam. Chopper 210 is controlled by control means 500, which may be a programmed general purpose digital computer, to control chopper 210 at a predetermined rate to give a predetermined rise time and predetermined repetition rate to the output pulse of the system. Control means 500 may also control the position of mirror 140, so that the return feedback radiation has a predetermined phase, in a conventional active control system. The total system comprises a composite resonator having ring resonator 10 and a leg, or section, of the composite resonator that will be referred to collectively as the feedback leg 40 and includes the aperture and mirror as the feedback means. This additional feedback leg provides additional feedback that reduces the loss of the composite optical resonator.

As will be explained below, feedback beam 45 is reflected back into resonator 10 in the reverse direction with a particular phase distribution such that it is mode matched to the reverse wave adjoint mode of the resonator (the demagnifying reverse wave). A definition of adjoint mode is given in "Orthogonality Properties of Optical Resonator Eigenmodes", by A. E. Siegman, Optics Comm., Vol. 31, pp. 369-373, Dec. 1979. The demagnification of the reverse wave adjoint mode causes the returned radiation to converge down into the optic axis of the resonator, making several passes before it spreads diffractively and contributes to the reverse wave output. The effect of this is to reduce the resonator loss (by increasing the system feedback) more than by other means of injecting the feedback beam, thus allowing a low power beam to have a large effect.

In the example shown, the output radiation is collimated, so the output beam is simply reflected with a flat mirror 140. In general, for a non-collimated output, a curved mirror will be necessary to mode match the adjoint mode of the resonator. The demagnifying reverse wave, (the adjoint mode of the magnifying reverse wave) is collimated in the same region in which the forward wave magnifying mode is collimated, but travels in the opposite direction. As this demagnifying reverse wave converges down toward the beam axis, it couples to the magnifying reverse wave. Radiation in the magnifying reverse wave is then coupled to the magnifying output mode by mirrors 270 and 272.

In the $CO_2$ gas laser embodiment illustrated in FIG. 1, the focal length of mirror 110 was 1.5 meters. The focal length of mirror of 120 was 1.0 meters and they were arranged in a confocal configuration. The nominal total circulating power in the beam was 10W. The output scraper 235 consisted of a mirror with a straight edge 2.5 mm from the optic axis. Combined with the 90° beam rotation, this gave a nominally rectangular beam of dimensions 10 by 12 mm. The aperture 245 in mirror 240 was circular and 1.5 mm in diameter, giving a feedback beam 45 of roughly 2% of the circulating power in beam 60.

Those skilled in the art will realize that a relatively high power feedback leg 40 could be used to pulse the laser on condition that: a) the cavity loss of the parent resonator is such that the small signal gain is below threshold when the shutter is closed and the laser does not oscillate; and b) that the magnitude of the feedback provided by beam 45 is large enough that the addition of the feedback beam puts the composite (resonator 10 plus control leg 40) laser above threshold. The condition can be paraphrased as requiring that the capacity of pump means 155 to maintain the population inversion in spite of the composite cavity loss must be above some threshold referred to as the "cw capacity" and the capacity of the pump must be such that it cannot maintain the inversion above threshold when the losses are those of parent resonator 10. The term capacity, as used here, means the capacity that the pump is set up to produce in this system, not its absolute maximum capacity. The feedback beam would also have to be sufficient to raise the laser from below threshold to above threshold with a margin or tolerance for variations in the operating parameters of the system. In a production model laser, the pumping means would run at maximum and the resonator loss would be designed to meet these criteria. The amount of feedback power required to switch a ring resonator using a non-adjoint feedback beam would be on the order of 10% of the circulating power. As is described below, such a large amount of feedback would require a heavy chopper.

It has been found that it is also possible to pulse the laser even if the cavity loss of the parent resonator is such that the small signal gain is above threshold, provided the repetition rate of the pulsing is sufficiently fast that the saturated gain resulting from lasing with the shutter open (so that the adjoint mode feedback beam returns to parent ring laser resonator 10) does not have sufficient time to recover while the shutter is closed. The saturated gain resulting from lasing with an open shutter will be below threshold without the additional feedback from the adjoint feedback beam and will remain so while the shutter is closed.

While the shutter is open, the gain in the laser will be reduced via saturation by the circulating power. By the end of the pulse the saturated gain will approach the cw limit in which the round trip gain just equals the cavity losses. When the shutter is closed, the cavity losses increase, the saturated gain is now below threshold, and laser output stops. The inversion in the gain medium is being repopulated by the pumping source, however, and the gain starts to increase towards its small signal level. When the shutter is opened, the cavity losses fall dramatically, the gain is now above threshold, and a pulse develops. The feedback beam feeds a very small amount of additional feedback power into the resonator. The additional power, on the order of 1% of the output power, would not be enough to initiate lasing in a conventional resonator configuration. Since the feedback power is in the adjoint mode, however, it "walks" through the volume of the resonator as the radiation converges radially down to the optic axis of the ring. Near the axis, diffractive spreading causes the adjoint beam to contribute to the resonator output. Thus the effect of the power fed back from leg 40 is essentially multiplied by the effect of making several passes through the gain medium before significant loss occurs.

With this increased effective feedback power, there is established a composite resonator feedback value, greater than the parent resonator feedback value of ring 10 by itself, that is sufficient to raise the composite resonator gain of the system above a composite threshold value, so that the circulating power in ring resonator 10 builds up rapidly to produce a sharp spike in the output characteristic of Q-switched lasers that falls off as the upper lasing state is depleted.

After the pulse, the laser output approaches the CW limit for the composite resonator. When the shutter closes, the saturated gain is now below threshold with the parent resonator. The pumping means will now start to increase the gain. In order for the laser to pulse strongly, the shutter must open before the gain has recovered sufficiently for the laser to oscillate with just the parent resonator.

The lower limit on the repetition rate is determined by this recovery time. For the embodiment of FIG. 1, this appears to be about 1 or 2 msec, giving a lower limit on the repetition rate of about 300 Hz. The upper limit on repetition rate is determined by the time for the shutter to cycle through one period (closed to open and back to closed) or by the time required for a pulse to build up in the composite resonator (normally about 10 round trip transit times), whichever is longer. For the embodiment of FIG. 1, the latter time is about 0.1 $\mu$sec, while the former is about 50 $\mu$sec for a mechanical chopper. This gives an upper limit to the repetition rate of about 20 KHz.

Both of these limits can be adjusted within a limited range. The lower limit can be extended by opening the shutter slowly, by using less pumping and/or by increasing the magnification of the resonator with the shutter closed relative to the effective magnification with the shutter open. The upper limit can be extended by using an electro-optic modulator for the shutter to hold the shutter open for a time on the order of 1 $\mu$sec and designing the resonator so that the upper level is depleted rapidly. For a given resonator design, there is a minimum time that the shutter must be kept open in order to deplete the upper state sufficiently to turn the laser off. For welding or hole-cutting applications, it does not matter if the laser is running with a long tail or even a cw background intensity with a Q-switch spike superimposed on it, so long as the intensity in the low level is too low to affect the workpiece.

Figure 3:
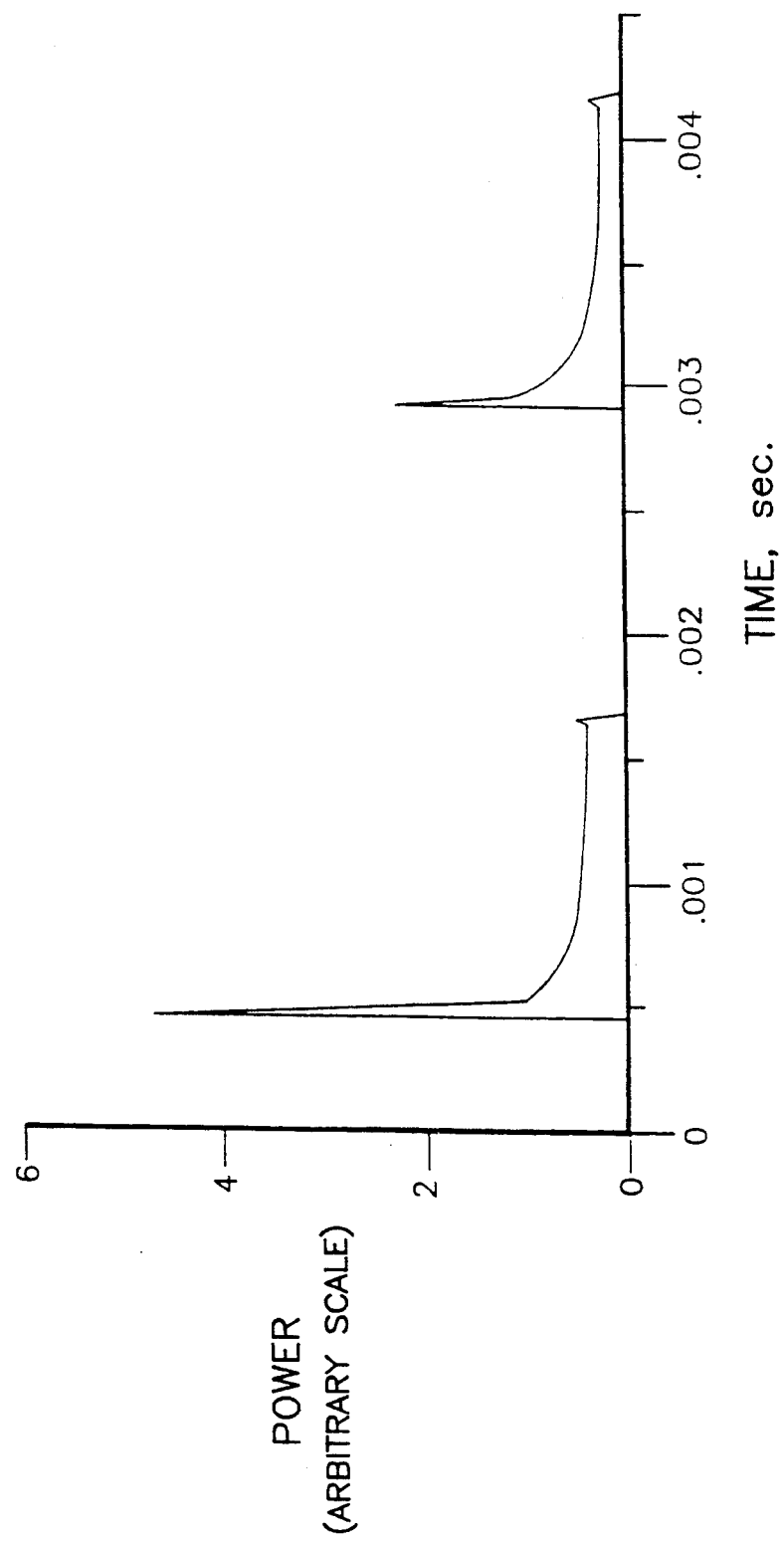
FIG. 3 illustrates pulsing of the main resonator.

In a first embodiment, the power supply 160 and $CO_2$ gain medium 150 were set so that the parent resonator 10 was above threshold, i.e., that it would oscillate continuous wave in the absence of the feedback leg 40. A plot of the power circulating in resonator 10 in this above threshold case is shown in FIG. 3.

The nominal repetition rate of chopper 210 is 400 Hz. It can be seen that there is a Q-switched spike at the start of each beam of a nominal width of 50 $\mu$sec and a relatively long tail with a nominal width of about 1 millisecond. It is noteworthy that the power drops to zero even though the parent resonator 10 was above threshold.

A nominal calculation for the amount of power required in the adjoint feedback leg 40 of the total system is given by a condition that the adjoint feedback of system 10 change by a significant factor in response to chopping of the beam in leg 40. The value of the eigenvalue for the total system in this case is given approximately by equation 1, $$\gamma_c = \frac{1}{M} + \sqrt{\frac{I_c}{I_o}} \ \frac{\sqrt{A_c A_s R_f}}{\lambda f_2} \tag{1}$$

where $\gamma_c$ is the composite resonator eigenvalue, M is the parent resonator magnification, $A_c$ is the area of the adjoint feedback beam as determined by aperture 245 in mirror 240, $A_s$ is the diameter of the collimated reverse wave at the reverse wave suppressor, $R_f$ is the effective reflectivity of the feedback section 40, and $f_2$ is the focal length of the primary mirror. $I_c$ is the beam intensity in the coupling aperture 245 and $I_0$ is the on-axis intensity. The cavity loss is given by $1-\gamma^2$. In the example shown in FIG. 1, M=1.5, $f_2$=1.5 m, $A_c$=0.02 cm$^2$, $R_f$=1, $A_s$=1, $A_s$=1 cm$^2$, and $\lambda$=10 $\mu$m.

We find using these values that the ratio of the feedback of the system in the presence of feedback beam 40 to the feedback with the chopper closed is given by $$\left(\frac{\gamma_c}{1/M}\right)^2 = \left[1 + \sqrt{\frac{I_c}{I_o}} \ \frac{M\sqrt{A_c A_s R_f}}{\lambda f_2}\right]^2 \tag{2}$$

$$= 1 + 1.4\sqrt{\frac{I_c}{I_o}}$$

Thus a feedback beam with only one percent of the forward wave output power is sufficient to increase the feedback of the composite system by an amount (in the range of tens of percent) sufficient to give the pulsing shown in FIG. 3. Calculation of the numerical values of $I_c$ and $I_0$ requires analysis using resonator propagation computer codes. Typical values of 10/1 have been noted in well designed configurations with one percent of the forward wave power corresponding to a feedback increase of 40%. The equation indicates the benefit of having the feedback aperture close to the center of the circulating beam. We speak in terms of increasing the feedback from a parent resonator value to a composite resonator feedback value. An equivalent description of the operation of the system could be expressed in terms of increasing the system eigenvalue from a parent resonator value to a composite resonator value or in terms of decreasing the resonator loss from a parent resonator value to a composite resonator value.

The "leverage" effect from the use of adjoint feedback rather than non-adjoint feedback results from the fact that in any unstable resonator the adjoint mode is converging down to the resonator axis 101, so that the radiation fed back in from adjoint beam 45 makes several passes as it "walks" or converges down to axis 101 as it is reflected between mirrors 110 and 120, before it spreads diffractively and contributes to the resonator loss. The adjoint feedback power thus makes many more passes through the gain medium than non-adjoint feedback power would.

Since the power in beam leg 40 is so low, an electro-optic modulator having a nominal switching time of 1 $\mu$sec can also be used. Suitable modulators are germanium acousto-optic modulators, commercially available at 10.6 $\mu$m from either Isomet Corp of Springfield, Va. or Intra Action Corp of Bellwood, Il. Also, CdTe and GaAs electro-optic switches for use at 10.6 $\mu$m are available from Two-Six Inc, Saxonburg, Pa. In this case, the rise and fall times of 100 microseconds will be reduced to 1 μsec and the limit will not be the mechanical traverse of the chopper across feedback aperture 145, but the build-up time to restore the population inversion above threshold. The output will be a Q-switched pulse having a spike with a width of 100 to 200 nanoseconds that will have a peak intensity of about 100 times the cw power. This sharper pulse will be followed by a low intensity tail with a width of about 10 microseconds. It is possible to shut off the laser by closing the shutter when the upper level is partially depleted below a value that will depend on the detailed resonator design.

Control of the feedback can produce an output beam having varied time dependence. The output power can have an initial ramp or rise time that can extend from a few nanoseconds to a time on the order of seconds. The width of the high power section may vary from about 100 nanoseconds to essentially cw. For example, if it is desired to have an initial peak in the intensity to ignite a plasma above a metal surface (as shown in U.S. Pat. No. 4,395,616 issued to D. C. Smith and R. G. Meyerand) and then to have a long pulse, resonator 10 will be set up to produce a cw beam when the shutter or chopper is partially open to a predetermined "steady" value that will produce the required power. This may be done with either a partially open mechanical shutter or a partially transmissive electro-optic modulator. When the shutter is fully open, a Q-switched spike occurs and when the shutter is fully closed, resonator 10 is below threshold. The DC power supply may also be varied in a time on the order of seconds to raise the gain in resonator 10 from an initial value suitable for suppressing cw operation to a higher value to provide the desired "flat top" output.

The fact that a feedback aperture having an area only about 1% of the area of the output beam (or intercepting about 1% of the output power) can have a noticeable effect on the output beam, in particular, on the phase and intensity distribution can be viewed as a consequence of the fact that the composite resonator will have different modes than the parent resonator. If the feedback aperture 145 is made too large, serious beam quality degradation can occur compared with the beam quality associated with the parent resonator. Beam quality is calculated conventionally as a measure of the deviation of the focal spot size of the actual focused output beam from diffraction-limited. Beam quality has been calculated to be a function of the radial position of aperture 145, with a position close to the center being slightly preferred.

In addition, there is a range of feedback aperture diameters for preferred operation. If the diameter of the feedback aperture is d, the limiting diameter of the resonator (mirror or gain medium) is D, and the distance between them is L', then there will be a significant loss of feedback power when $2\lambda L'/d > D$, i.e. $d > 2\lambda L'/D$ is preferred. The beam quality perturbations discussed above set a limit on the maximum diameter that can be tolerated for aperture 145. Thus, d should be between a lower bound set by the diffraction limit and an upper bound set by the beam quality. Other parameters of the system may be varied, such as placing a smaller aperture in a more intense portion of the output radiation, so that the optimum design trade off will depend on the design of the parent resonator and the required beam quality (2× diffraction limited, 4×-, etc.). Increasing the magnification of parent resonator 10 will enhance the suppression of cw oscillation (and vice versa). Additionally, decreased magnification will produce greater intensity and so permit the use of a smaller feedback aperture.

Those skilled in the art may readily devise other embodiments of the invention. In general, the output feedback aperture and the return aperture need not be the same, though the embodiment of FIG. 1 uses a single aperture. The feedback aperture need not be placed on the output mirror. Those skilled in the art will appreciate that mechanical chopper 210 may be replaced by a solid-state modulator, either an acousticoptic or an electro-optical modulator. Also, aperture 245 in mirror 240 may be replaced by a small mirror mounted to intercept output beam 50. Likewise, the return beam could be coupled into the ring by reflection off a mirror or through an aperture. The term "feedback coupling means" will be used as a general term to denote apertures and/or mirrors.

Within resonator 10, radiation travels in two directions arbitrarily labelled—forward and reverse. In each direction, there are two modes—magnifying and demagnifying, for a total of four modes. In the terminology used here, each magnifying mode has an adjoint demagnifying mode, so that, using the usual convention of referring to the magnifying modes as the primary modes, the system has two adjoint (demagnifying modes) modes. In the embodiment of FIG. 1, the outgoing feedback radiation is taken from the forward magnifying mode, so that there are two adjoint modes available—the demagnifying forward mode and the demagnifying reverse mode. The collimated return feedback radiation is mode matched to the demagnifying reverse mode, which is collimated in that leg of the resonator, not to the demagnifying forward mode. The return feedback radiation could be mode-matched to the demagnifying forward mode, but the optics required to do this would be more complex. It is preferable to go "the long way around" by feeding the radiation back in the demagnifying reverse mode, letting diffraction spreading couple the fed-back radiation to the magnifying reverse mode and then using the reverse coupling system to couple to the magnifying forward mode. The definition of adjoint is, however, more general than connecting magnifying and demagnifying modes. In general, adjoint modes have the same transverse coordinate dependence of the modes and may have either direction of propagation. In this sense, both the magnifying reverse wave and the demagnifying forward wave are adjoints of the magnifying forward wave. Unless required by the context, the term adjoint mode will mean the demagnifying mode propagating in the same direction as the mode for which it is the adjoint.

In the case illustrated, there is another location where modulation may be performed with a relatively low power beam. A chopper may be placed in the reverse wave suppressor system, between mirrors 270 and 272. In that area, a portion of the magnifying reverse mode is converted to a return adjoint feedback beam mode-matched to the demagnifying forward wave. Since the magnifying reverse mode is not collimated in that region, mirror 270 is curved to mode-match the return radiation to the demagnifying forward mode, which is diverging in that region. Radiation in the demagnifying reverse mode then diffractively couples to the magnifying forward mode. In all of these cases, we will refer to "an adjoint mode" since the return radiation is mode-matched to one of the possible adjoint modes of the system.

One skilled in the art would have thought that the use of a resonator leg 40 would result in a difficult length control problem, in that the above-cited U.S. Pat. No. 4,550,410 teaches that a coupled-cavity laser is extremely sensitive to the length of the external cavity. It has been found in high power tests on standing wave resonators and low power tests with ring resonators that the composite resonator is very insensitive to the length of the control leg. Successful operation was achieved with no active control and the feedback mirror resting unconfined on a surface, unprotected from vibration and other perturbation It was found from low power tests on standing wave resonators that the composite resonator ran on the transition for which the cavity loss in the composite resonator was lowest. $CO_2$ lasers are very well adapted to this, but any gain medium with a broad gain profile will have a correspondingly reduced sensitivity to a length change. The invention has been tested with $CO_2$ lasers, but is not restricted to any gain medium or frequency range. Operation with YAG lasers or in the visible is also suitable. For the case of a gain medium with a narrow gain profile, active length control of the feedback means may be required. A control leg 40 that is not set in advance or actively controlled to have a optical path length equal to a preset amount will be referred to as having "an unconstrained cavity length". In the embodiment of FIG. 1, the optical path length from scraper 235 to retro mirror 140 plus the path length from scraper 272 to reverse wave suppressor mirror 270 minus the distance between the scrapers 235 and 272 (measured via mirrors 220, 225, 230, 232, and 240) must equal an integral number of wavelengths. This gives constructive interference for all the feedback beams with the circulating beams in the ring resonator, which is the fundamental test.

Other gain media could be used such as Nd:YAG, oxygen-iodine, or hydrogen fluoride. Any gain medium could be used which is continuously pumped and has sufficient gain and available volume ("mode volume" is normally the term used) to justify the use of unstable resonators. Unstable resonators are normally used only where there is high gain and a large cross-sectional area (mode volume) of gain available. The range of repetition rates permissible will depend on the kinetics of the gain medium used. Other pump means are appropriate: flashlamps or diode lasers are used to pump Nd:YAG; a chemical reaction at the exit of a supersonic nozzle is used to pump oxygen-iodine and hydrogen fluoride (they are chemical lasers). Any pump means that is continuous or even pulsed, if the pulse lengths are long compared to the length of pulses desired, is permissible.

The use of a collimated region in the ring and of a collimated output beam is convenient, but not essential. The output beam could be either converging or diverging, with an appropriate conventional optic being used to transform the feedback beam to the adjoint mode.

It should be understood that the invention is not limited to the particular embodiments shown and described herein, but that various changes and modifications may be made without departing from the spirit and scope of this novel concept as defined by the following claims.

We claim:

1. A laser system including a parent ring laser resonator having a gain medium, including substantially DC pump means for producing a population inversion in a gain medium in said gain region, said parent ring laser resonator having a predetermined gain threshold for lasing operation a predetermined parent resonator feedback value and comprising:

mirror means for transporting radiation about a parent ring in a magnifying output mode and a demagnifying adjoint mode; and feedback coupling means disposed to intercept radiation in said magnifying output mode, whereby radiation in said magnifying output mode passes through said feedback coupling means as an output coupling beam, characterized in that:

adjoint feedback reflection means is disposed to receive radiation passed through output feedback coupling means, included within said feedback coupling means, and to feed back into said parent ring resonator through a return feedback coupling means included within said feedback coupling means an adjoint mode feedback beam mode matched to said demagnifying adjoint mode, whereby said magnifying output mode in said resonator is coupled to said demagnifying mode in said resonator through said adjoint mode feedback beam passing through said return feedback coupling means feedback beam modulation means are located intercepting said adjoint mode feedback beam, for controllably obstructing and passing said adjoint mode feedback beam, whereby said system comprises a composite laser resonator including both said parent ring laser resonator and a resonator control leg, coupled to said ring laser resonator, comprising said adjoint feedback reflection means and said beam modulation means;

said pump means maintains said population inversion at a predetermined value relative to a parent ring resonator threshold characteristic of said parent ring laser resonator; and said feedback coupling means is sized and disposed to feed back into said parent ring laser resonator a predetermined amount of power in said adjoint mode feedback beam and to establish a composite resonator feedback value greater than said parent resonator feedback value and sufficient to raise a composite resonator gain characteristic of said composite ring resonator above a threshold value, whereby lasing in said ring laser resonator is controllably switched by said beam modulation means.

2. A laser system according to claim 1, further characterized in that said parent ring laser resonator includes a collimated region and in that said output means is located in said collimated region.

3. A laser system according to claim 2, further characterized in that said feedback coupling means includes at least one feedback aperture in a mirror intercepting a collimated output beam.

4. A laser system according to any of claims 1, 2, or 3, further characterized in that said beam modulation means is mechanical.

5. A laser system according to any of claims 1, 2, or 3, further characterized in that said beam modulation means includes a solid state modulator.

6. A laser system according to any of claims 1, 2, or 3, further characterized in that said resonator control leg has an unconstrained path length.

7. A laser system according to claim 6, further characterized in that said beam modulation means is mechanical.

8. A laser system according to claim 6, further characterized in that said beam modulation means includes a solid state modulator.

9. A laser system according to any of claims 1, 2 or 3, further characterized in that said radiation in said magnifying output mode travels in a first direction about said laser ring resonator and said radiation in said demagnifying adjoint mode travels in a second direction opposite to said first direction about said laser ring resonator.

10. A laser system comprising a parent ring laser resonator having a gain medium, substantially DC pump means for producing a population inversion in said gain medium, resonating means for directing optical radiation through said gain medium in a magnifying output mode and a demagnifying adjoint mode, a predetermined parent resonator gain threshold for lasing operation, and output means for directing an output beam out of said unstable resonator, comprising:
- feedback coupling means disposed to intercept radiation in said magnifying output mode, whereby radiation in said output magnifying mode passes through said feedback coupling means as an output feedback beam; and
- adjoint feedback means for passing through said feedback coupling means an adjoint mode feedback beam in said demagnifying adjoint mode, characterized in that:
- said adjoint feedback means includes adjoint feedback reflection means for receiving said output feedback beam passed through said feedback coupling means and for feeding back through said feedback coupling means an adjoint mode feedback beam mode matched to said demagnifying adjoint mode, whereby radiation in said output mode in said resonator is coupled to said adjoint mode in said laser resonator through said adjoint mode feedback beam passing through said feedback coupling means,
- feedback beam modulation means are located intercepting said output feedback beam, for controllably interrupting said output feedback beam, whereby said system comprises a composite laser resonator including both said parent laser resonator and a resonator control leg comprising said adjoint feedback reflection means and said beam modulation means, said parent ring laser resonator and said resonator control leg together forming a composite laser resonator having a composite threshold value;
- said pump means has a predetermined capacity sufficient to raise said population inversion to a predetermined amount below said parent resonator threshold characteristic of said parent laser resonator; and
- said feedback coupling means is sized and disposed to feed back into said parent ring laser resonator a predetermined amount of power in said adjoint mode feedback beam and to establish a composite resonator feedback value greater than said parent resonator feedback value and sufficient to raise a composite laser resonator gain characteristic of said composite resonator above a composite threshold value by a predetermined amount, whereby lasing in said ring laser resonator is controllably switched by said beam modulation means.

11. A laser system according to claim 10, further characterized in that said parent ring laser resonator includes a collimated region and in that said output means is located in said collimated region.

12. A laser system according to claim 11, further characterized in that said feedback coupling means includes at least one feedback aperture in a mirror intercepting a collimated output beam.

13. A laser system according to any of claims 10, 11, or 12, further characterized in that said beam modulation means is mechanical.

14. A laser system according to any of claims 10, 11, or 12, further characterized in that said beam modulation means includes a solid state modulator.

15. A laser system according to any of claims 10, 11, or 12, further characterized in that said resonator control leg has an unconstrained cavity length.

16. A laser system according to claim 15, further characterized in that said beam modulation means is mechanical.

17. A laser system according to claim 15, further characterized in that said beam modulation means includes a solid state modulator.

18. A laser system including a parent ring laser resonator having a gain medium, including substantially DC pump means for producing a population inversion in a gain medium in said gain region, said parent ring laser resonator having a predetermined gain threshold for lasing operation a predetermined parent resonator feedback value and comprising;
- mirror means for transporting radiation about a parent ring in a magnifying forward mode, a magnifying reverse mode, a demagnifying forward mode and a demagnifying reverse mode; and
- mode coupling means disposed to intercept radiation in said magnifying reverse mode, and to feed back into said parent ring resonator an adjoint mode feedback beam mode matched to said demagnifying forward mode, whereby said magnifying forward mode in said resonator is coupled to said demagnifying mode in said resonator through said adjoint mode feedback beam passing through said return feedback coupling means, characterized in that:
- adjoint feedback reflection means is disposed to receive radiation passed through forward feedback coupling means, included within said feedback coupling means,
- feedback beam modulation means are located intercepting said adjoint mode feedback beam, for controllably obstructing and passing said adjoint mode feedback beam, whereby said system comprises a composite laser resonator including both said parent ring laser resonator and a resonator control leg, coupled to said ring laser resonator, comprising said adjoint feedback reflection means and said beam modulation means;
- said pump means maintains said population inversion at a predetermined value relative to a parent ring resonator threshold characteristic of said parent ring laser resonator; and
- said feedback coupling means is sized and disposed to feed back into said parent ring laser resonator a predetermined amount of power in said adjoint mode feedback beam and to establish a composite resonator feedback value greater than said parent resonator feedback value and sufficient to raise a composite laser resonator gain characteristic of said composite ring resonator above a threshold value, whereby lasing in said ring laser resonator is controllably switched by said beam modulation means.

19. A laser system according to 18, further characterized in that said resonator control leg has an unconstrained path length.